(12) United States Patent
Hatzor

(10) Patent No.: US 6,722,474 B2
(45) Date of Patent: Apr. 20, 2004

(54) SMART SERVICE UNIT

(76) Inventor: Eran Golan Hatzor, 18 Simtat Hagiva, Savion 56530 (IL)

( * ) Notice: Subject to any disclaimer, the term of this patent is extended or adjusted under 35 U.S.C. 154(b) by 0 days.

(21) Appl. No.: 10/105,889

(22) Filed: Mar. 26, 2002

(65) Prior Publication Data

US 2003/0183456 A1 Oct. 2, 2003

(51) Int. Cl.[7] .................................................. E04H 3/04
(52) U.S. Cl. ......................................... 186/39; 186/40
(58) Field of Search ................................ 219/213, 214; 186/38, 39, 35, 36, 40; 52/143, 122.1, 110, 173.1; 455/575, 90; 212/180

(56) References Cited

U.S. PATENT DOCUMENTS

| | | | | |
|---|---|---|---|---|
| 458,738 A | * | 9/1891 | Palmer | 296/22 |
| 3,288,515 A | * | 11/1966 | Glover | 296/22 |
| 5,042,686 A | | 8/1991 | Stucki | |
| 5,285,604 A | * | 2/1994 | Carlin | 52/79.1 |
| 6,158,174 A | | 12/2000 | Mairs | |
| 6,189,944 B1 | * | 2/2001 | Piche | 296/22 |

FOREIGN PATENT DOCUMENTS

| | | | | |
|---|---|---|---|---|
| DE | 100 31 532 A1 | 10/2001 | | |
| FR | 2 584 123 A1 | 1/1987 | | |
| GB | 2.075.083 A | * | 11/1981 | E04H/1/12 |

* cited by examiner

Primary Examiner—Donald P. Walsh
Assistant Examiner—Mark J Beauchaine
(74) Attorney, Agent, or Firm—Browdy and Neimark, P.L.L.C.

(57) ABSTRACT

A non self-propelled mobile food service unit transportable to a desired location of service comprises computer controlled auxiliary systems for providing food service. The auxiliary systems including an environmental unit, a food preparation unit, a billing unit, a safety and security unit and a data communication unit.

18 Claims, 6 Drawing Sheets

SMART SERVICE UNIT

FIELD OF THE INVENTION

This invention relates to the sale of fast food in mobile food service units.

BACKGROUND OF THE INVENTION

The fast food industry has become an essential part of everyday modern life. Nowadays, many people consume fast food,—such as hamburgers, pizza, sandwiches, hot dogs, gourmet coffee and the like. People buy fast food throughout the day at every possible location, from shopping malls to sports arenas.

The financial success of a particular fast food restaurant or service point greatly depends upon its being in the right location at the right time, i.e. its availability to consumers. Consumers may travel a considerable amount of time to their favorite gourmet restaurant, but tend to choose fast food restaurants for convenience. Consumers also tend to choose a familiar franchise in order to benefit from the advantages provided by the known chains, such as the guarantee of quality, hygiene and taste.

The major fast food chains are located in commercial areas and are usually managed in a uniform fashion, as they are required to operate according to established standards so as to maintain the reputation of the chain's brand name. The known food chains are usually located in modern/and or renovated buildings and surroundings, which provide all the elementary infrastructures and utilities required for a restaurant. They provide facilities for the efficient storage of foodstuffs and cutlery and utilize sophisticated systems for the operational tasks of cooking, serving food, and receiving payment, and maintain (and in some cases even develop) sophisticated systems to monitor that the aforementioned operational tasks are carried out in accordance with company standards and policies.

Establishing a franchise of a well-established company is very costly, due to the high price of commercial space and expenses incurred for managing and controlling the franchise up to company standards. Furthermore, the franchise is dependent upon other factors, such as timing (i.e., moving in or out of various locations due to variable factors affecting profits such as the increase or decrease of the commercial activity and population of the surrounding neighborhood).

Additional factors that often influence the time-to-market insofar as establishment of a service point of a chain in a given location (and a fortiori a wide circulation of chain service points in selected locations) are the municipal and other bureaucratic proceedings involved e.g., building and safety inspections, local utility hook ups and operational licenses, etc.

Mobile fast food stands have been used for quite some time. A common known one is the typical food stand, say a "hot dog stand", which is a self-contained unit, as it includes, at best, a refrigerator unit to store the food being sold the same day (hot dogs, rolls and condiments); a hot dog heating/grill element, perhaps a drink unit and some sort of cash register. The operational advantage of this stand is that it is easily moved from place to place, and merely requires a simple local electrical connection.

The disadvantage of the above stand is that it is not adaptable to state-of-the-art technology available in today's fast food industry. The typical "hot dog stand" is exposed to environmental disruptions such as noise and pollution. Its operation is limited to the relatively small stock it may contain and to the incident condition of its systems. Thus it is quite difficult to maintain high and stable levels of quality control (i.e. hygiene, cooking standards and the like). Moreover, there is no way to centrally control the operation of the stand (or a plurality of stands operating under the brand name of a known food chain) and thus maintain the standards of the food chain.

In recent years, the authorities in many countries have passed legislation in order to broaden the protection of public health by establishing strict regulations concerning many aspects of food services including storage, serving, hygiene requirements and the like (the EU is in the process of establishing a EU food safety policy including the establishment of a EU food Authority, which demonstrates the current trend). Accordingly, the administrative requirements for food service licensing have become more strict, thus greater efforts are needed to uphold this requirement to obtain and maintain the needed licensing.

There is, thus, a need in the art to provide a mobile food service unit typically, although not necessarily, belonging to or franchised by a food chain that can be selectively managed and controlled by a central headquarters. Such a stand or stands have advantages of known mobile food stands, whilst maintaining high operational standards.

GENERAL DESCRIPTION OF THE INVENTION

The invention provides for a mobile food service unit designed to contain highly sophisticated technological facilities, whose operation is computer controlled. The invention uniquely integrates known technologies and facilities so as to achieve advantages in operating a mobile food service unit per se (i.e. a "smart" food service unit), and in managing a fast food chain utilizing the concept of the smart food service unit.

According to the preferred embodiment of the invention, the unit maintains communication with a headquarters that selectively monitors and controls the operational activities of the unit and its staff by utilizing known modern technologies. In another mode of operation, the unit is self-contained and operates autonomously.

Accordingly, the invention provides for a non self-propelled mobile food service unit transportable to a desired location of service, comprising: computer controlled auxiliary systems for providing food service; said auxiliary systems including:
 at least one environmental unit;
 at least one food preparation unit;
 at least one billing unit;
 at least one safety and security unit;
 at least one data communication unit.

The term "non self-propelled" is used to denote a mobile unit that lacks its own motored driving mechanism. Thus, in order to relocate the unit, an external mechanism, such as a boom-truck or a tow platform should be used to transport the unit to the desired location of service.

By one embodiment the invention provides a non self-propelled mobile food service unit transportable to a desired location of service, comprising: computer controlled auxiliary systems for providing food service; said auxiliary systems including:
 at least one environmental unit;
 at least one food preparation unit;
 at least one billing unit;

at least one safety and security unit;

at least one data communication unit,

Wherein the food stand has weight and size that facilitate efficient transportation from one place to the other.

The term "efficient transport" is used to denote transportation of one or more units through urban and interurban roads, e.g. by a boom-truck or a tow platform, substantially without causing the obstruction of traffic due to speed limits, blocked roads, escorts and the like, in accordance with traffic regulations. Thus, in order to meet the efficient transport stipulations, the food service unit, according to an embodiment of the invention, is limited in size and weight.

As specified, the auxiliary systems are computer controlled, locally, remotely or by some combination thereof through wired and/or wireless communication medium.

The invention further provides a food chain system that includes a plurality of non self-propelled mobile food stands located at geographically dispersed points of service; each food stand being a non self-propelled mobile food service unit transportable to a desired unit of service, and comprising: computer controlled auxiliary systems for providing food service; said auxiliary systems including:

at least one environmental unit;

at least one food preparation unit;

at least one billing unit;

at least one safety and security unit;

at least one data communication unit.

The invention further provides a non self-propelled mobile service unit transportable to a desired location of service, comprising: computer controlled auxiliary systems for providing food service; said auxiliary systems including:

at least one environmental unit;

at least one dedicated service unit;

at least one billing unit;

at least one safety and security unit;

at least one data communication unit.

The invention further provides service chain system that includes a plurality of non self-propelled mobile service stands located at geographically dispersed units of service; each service stand being a non self-propelled mobile service unit transportable to a desired point of service, and comprising: computer controlled auxiliary systems for providing food service; said auxiliary systems including:

at least one environmental unit;

at least one dedicated service unit;

at least one billing unit;

at least one safety and security unit;

at least one data communication unit.

Accordingly, the invention provides for a method for operating a non self-propelled mobile food service unit comprising:

transporting said unit to a desired location of service;

selectively establishing connection between said unit and a remote site; and upon establishing connection, receiving instructions from the remote site regarding the condition and operation of said unit by using computer controlled means; said means including:

environmental means;

food preparation means;

billing means;

safety and security means.

According to another embodiment, the invention provides a method for operating a food chain system that includes a plurality of non self-propelled mobile food stands; each food stand being a non self-propelled mobile food service unit transportable to a desired point of service, and comprising:

determining the locating of the food stands at geographically dispersed points of service; and monitoring and controlling the condition and operation of each food stands from a remote headquarters using computer controlled auxiliary systems for providing food service; said auxiliary systems including:

at least one environmental unit;

at least one food preparation unit;

at least one billing unit;

at least one safety and security unit; and at least one data communication unit;

According to yet another embodiment, the invention provides a method for operating a food chain system that includes a plurality of non self-propelled mobile food stands; each food stand being a non self-propelled mobile food service unit transportable to a desired point of service, and comprising:

determining the locating of the food stands at geographically dispersed points of service;

monitoring and controlling the condition and operation of each food stands from a remote headquarters using computer controlled auxiliary systems for providing food service; and relocating at least one of the food stands in accordance with a instructions from said remote headquarters, said auxiliary systems including:

at least one environmental unit;

at least one food preparation unit;

at least one billing unit;

at least one safety and security unit; and at least one data communication unit;

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT OF THE INVENTION

According to the preferred embodiment, the invention is a non-self-propelled mobile food service point unit efficiently transportable to a desired location of service. The unit has a rigid and lightweight structure and is configured to operate by one person in a computer-controlled fashion. In accordance with the invention, known technologies and facilities are uniquely integrated so as to achieve advantages in operating a mobile food service unit per se (i.e. a "smart" food service unit), and in managing a fast food chain utilizing the concept of the smart food service unit.

The unit lacks its own motorized driving mechanism and, thus, an external mechanism such as a boom-truck or a tow platform is required for the relocation of the unit. By a non-limiting example, the unit is lifted by the crane and placed on the truck platform which is long enough to accommodate one or possibly several units (e.g. 2–4).

For the transportation of one or more units through urban and interurban roads, e.g. by a boom-truck or a tow platform, substantially without causing the obstruction of traffic due to speed limits, blocked roads, escorts and the like, in accordance with traffic regulations, the food service unit, according to the invention, is limited in size and weight. According to a preferred embodiment, the unit is limited to a diameter of 3.2 meters and weight of 2000 Kg. Note that the specified size and weight values are by no means binding.

Figure 1A:
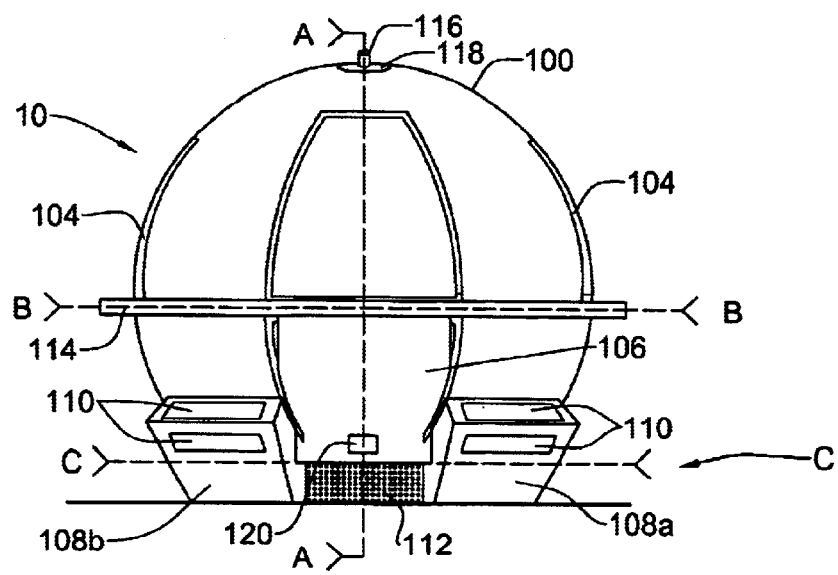
FIGS. 1a–1c show schematic front, back and side views of a food service unit according to a preferred embodiment of the invention.
Figure 1B:
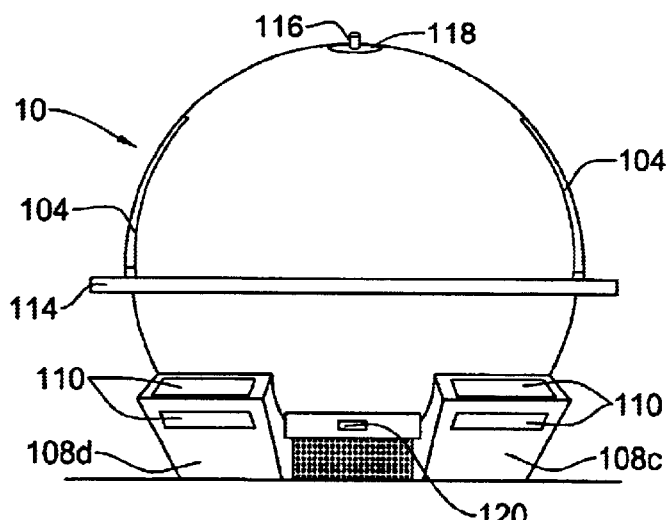
Figure 1C:
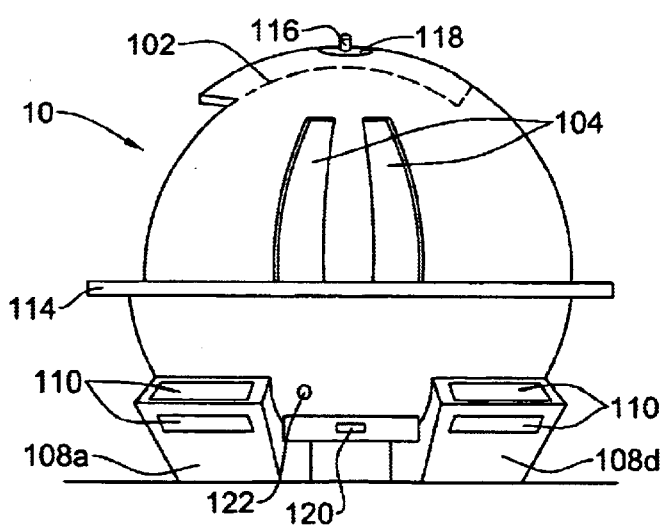
Figure 2:
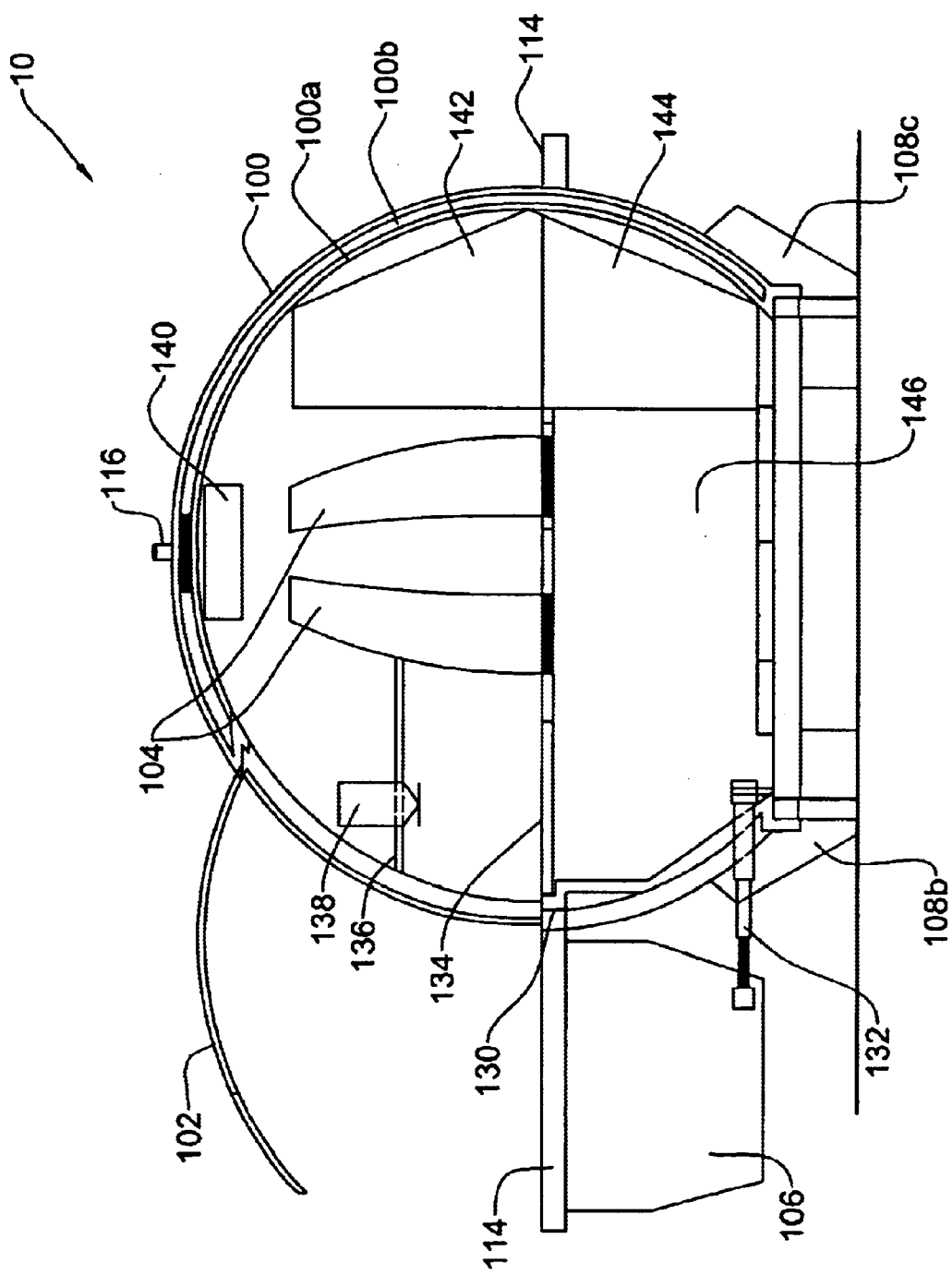
FIGS. 2 shows a schematic longitudinal cross section view along A—A of a food service unit according to a preferred embodiment of the invention.
Figure 3:
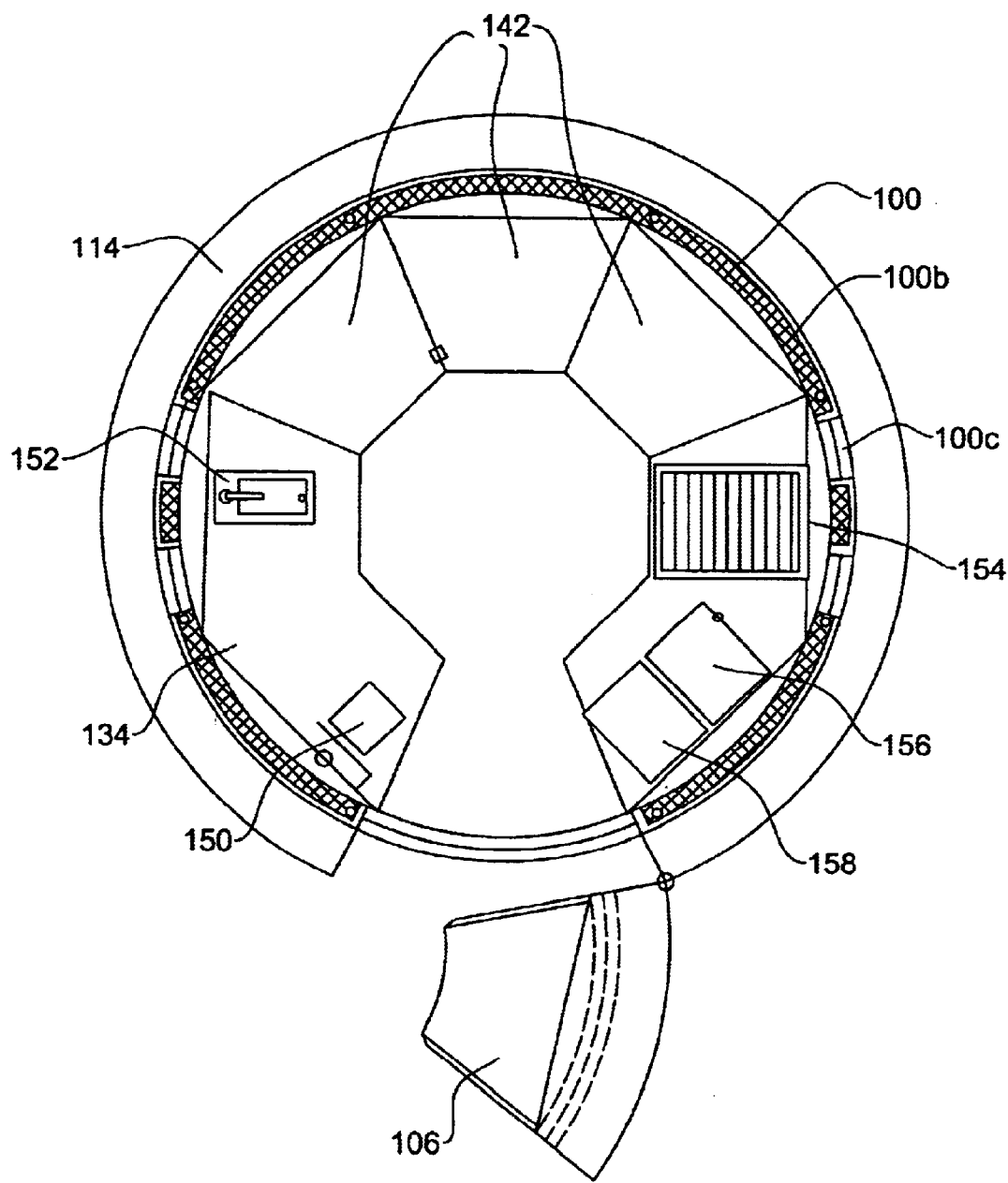
FIG. 3 shows a schematic lateral cross section view along B—B of a food service unit according to a preferred embodiment of the invention.
Figure 4:
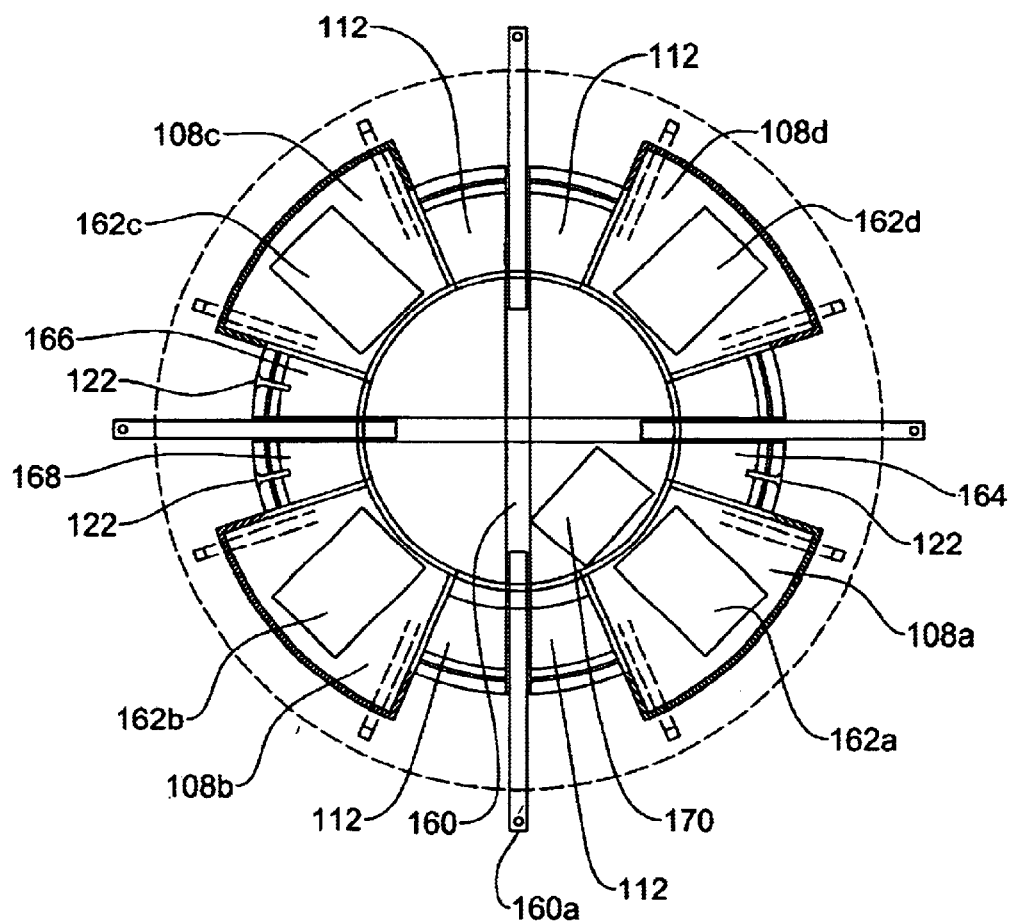
FIG. 4 shows a schematic lateral cross section view along C—C of a food service unit according to a preferred embodiment of the invention.

Reference is now drawn to FIGS. 1a–1c showing schematic front, back and side views of a food service unit according to a preferred embodiment of the invention and also to FIGS. 2–4, showing schematic cross-section views thereof.

Thus, unit 10 has a substantially spherical shape that enables to achieve rigid construction with relatively low weight. The outer surface 100 is formed of rigid and lightweight materials such as aluminum compounds, stainless steel, fiber glass-reinforced-concrete (GRC), glass-reinforced-polymer (GRP) and the like, to protect the sophisticated facilities inside the unit from human and environmental damage, as well as wear and tear occurring during the relocation of the unit.

A service window 102 in the front of the unit is shown in its 'closed' position in FIG. 1a. The window 102 can be opened without extending beyond the outer surface 100, i.e. to be raised and lowered within the unit. The 'open' position is shown in FIG. 1c where the window has been moved inwardly within the unit to the position marked in dashed lines 102. Alternatively, or in addition, the window 102 can be opened outwardly, away from the unit, so as to serve as a marquis to guard against both the sun and rain (as shown in FIG. 2). The invention is not bound by the use of a service window or windows in the manner specified. Side windows 104 are used to let daylight in to illuminate the unit, along with internal lighting fixtures (not shown). By this embodiment, the windows 104 are located in the upper half of the unit. However, windows 104 are not limited to that configuration and thus can be installed in the lower side of the unit or at other locations, all as required and appropriate.

A main entrance door 106 serves for walking in and out the unit and is located at the lower half of the unit. As shown in FIG. 2, the door 106 is constructed to slide about axis 130 to the open position by means of pneumatic arm 132. The invention is not bound by the use of a main entrance door in the manner specified. For example, the main entrance door may also be constructed so as to hold not only the door 106 as shown in FIGS. 1a–1c, but also the window 104, thus allowing elements 106 and 104 to be moved as one object to the 'open' position, and upon returning together to their 'closed' position, to let window 104 be opened as described above.

Reverting now to FIGS. 1a–1c, sub-units 108a–108d are located at the bottom of unit 10 to contain light elements 110 and power elements (which will be discussed below). Also shown are ventilation chambers 112, whose operation will be explained in greater detail with reference to FIG. 4, below. Additional external light fixtures may be installed, depending upon the particular application. The use of sub-units in the manner specified is by no means binding.

A counter 114 runs around the outer surface 100 of the unit 10, to be used by customers. If desired, the counter 114 can be designed instead, as a series of short successive counters (not shown) or confined to only run across the door 106 (to function as a service counter). Alternatively, the counter 114 can be eliminated altogether. The unit 10 may contain benches and tables attached to the outer surface 100, that may be folded out therefrom (not shown). The invention is not bound by the use of a counter or counters in the manner specified.

A digital socket 116 located at the top of the unit enables the installation of an antenna (e.g. GSM, i.e. Global System for Mobile communication) enabling the unit to maintain communication with remote locations and also, to connect the unit to a digital advertising unit (not shown), the operation of which will be explained with reference to FIG. 6. A top anchor 118 and lifting bars (denoted 160 in FIG. 4), which are located behind small doors 120, are used by the crane to lift the unit 10. An inlet 122 serves for the refueling and emptying of fuel to and from a designated fuel tank (discussed with reference to FIG. 4, below). Other inlets (not shown) serve to refill a water tank 166 (FIG. 4) and empty a waste tank 168 (FIG. 4). As before, the invention is not bound by this specific arrangement.

FIG. 2 shows a schematic longitudinal cross section view along A—A of a food service unit according to a preferred embodiment of the invention.

An inner surface 100a is constructed so as to establish a hollow space 100b between the inner surface 100a and outer surface 100 (also shown in FIG. 3). The space 100b accommodates communication and power wiring, fluid tubing, ventilation chambers and such, all as required and appropriate. The invention is of course not bound by this construction, and accordingly other means, in addition or in lieu of the specified space, may be used.

Also shown in FIG. 2 is a working area 134 (best seen in FIG. 3), a shelf 136, food condiment dispensers 138, which are tightly secured to the shelf 136, an air-condition unit 140, a refrigerator 142, a freezer 144 and storage 146. Not shown are additional facilities that can be placed onto the shelf 136, such as small storage trays, food serving elements, and the like. The invention is, of course, not bound by this specific configuration.

FIG. 3 shows a schematic lateral cross section view along B—B of a food service unit according to a preferred embodiment of the invention. A billing unit 150 is placed onto the working area 134 along with food preparation units—such as a grill 154, a steaming element 156 and a heating plate 158. Not shown are additional food preparation units such as coffee and ice cream machines. Note that the invention is not bound by the specified food preparation units and other or others may be used in addition or instead of the specified units.

A basin 152 is connected to the water tank 166 and a sewage tank 168 (shown in FIG. 4).

FIG. 4 shows a schematic lateral cross section view along C—C of a food service unit according to a preferred embodiment of the invention. Lifting bars 160 have telescopic arms 160a that are able to extend from the outer surface 100 of the unit 10 and to be connected to a lifting crane, as described above. The above-mentioned sub-units 108a–108d host the power element—generator 162a, air-condition engine 162b, freezer engine 162c and refrigerator engine 162d. Sub-units 108a–108d all have doors (not shown) that enable easy access to the power element—generator 162a from the exterior of the unit 10, for efficient maintenance and replacement. The fuel tank 164, water tank 166 and sewage tank 168 are also located in the floor plane. The power elements 162a–162d are fed with fuel from fuel tank 164 by means of feeding ducts, not shown. Note also that generator 162a is coupled to acoustic silencer 170. Not shown in FIGS. 1–4 are additional and optional systems which may also be deployed within the unit 10, such as: a solar power system and a battery power unit (which serves as a backup for the generator), fire detection system (which also includes sprinklers); waste water recycling system; additional security systems such as fingerprint scanning security system or a voice recognition system.

It should be understood that the invention is not limited to the specific configuration described above with respect to FIGS. 1a–1c, 2–4.

The unit 10 is self-functioning, i.e. is able to function upon being located in a specific location without or substantially without the need to be connected to the local infrastructures, and by that able to achieve high operational efficiency and to reduce the time-to-market factor. However it is possible to operate unit 10 in a manner that utilizes local facilities such as electricity, water supply and the like.

The main auxiliary systems are coupled to a control computer, thus enabling the continuous monitoring, analyzing, operating and controlling of various parameters and processes of the unit. The operation and condition of the unit 10 can be selectively controlled by a local computer or by a remote computer, or by a combination of both. Thus, as described above, a supervisory control and data acquisition (SCADA) system, including hardware and software components, is incorporated into the smart service unit and/or to the remote computer to allow the unit's operation and condition to be monitored and controlled by both a remote and local computer. According to the preferred embodiment of the invention, each of the control computers is assigned a program logic control (PLC) unit and thus the continuous control activities are partially carried out by the remote computer and partially by the local computer. According to another embodiment, only the remote computer is assigned a program logic control (PLC) unit to thereby monitor and control all operations of the unit from a remote location. According to another embodiment, the local computer is able to autonomously monitor and control the unit operations. In the above mentioned embodiments, the local computer is able to perform control activities independently, however, it is also possible to have the remote computer take over the control of the local computer to carry out the required functions.

Figure 5:
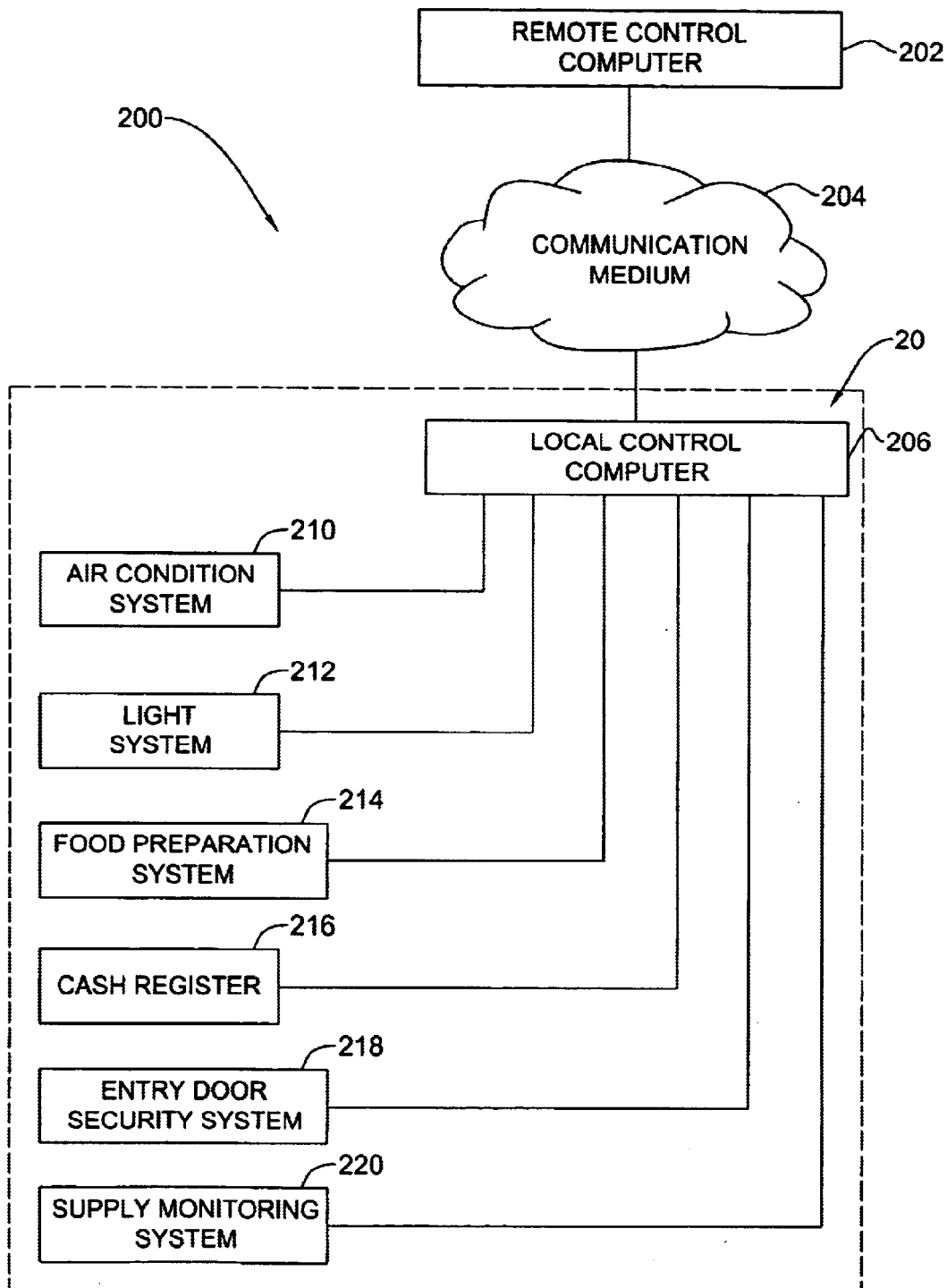
FIG. 5 shows schematically a system architecture according to a preferred embodiment of the invention.

FIG. 5 shows the control architecture 200 according to the preferred embodiment of the invention, according to which the food service unit 20 is partially controlled by a remote computer 202 and partially by a local computer 206. The SCADA system itself, including its hardware and software, do not form part of the invention and a known commercial SCADA system may be employed in order to achieve the control architecture according to the invention. Accordingly, the partial and illustrative details included in FIG. 5 only demonstrate the principals of the control architecture according to the invention and the invention is not bound by this specific example.

By the preferred embodiment, the auxiliary systems 210–220 are assigned with monitoring sensors that generate digital data indicative of their condition and/or operation and are coupled to the local computer 206. The local computer 206 is connected to the remote computer 202 through a wired and/or wireless communication medium 204. The control computers actuate at least one of a plurality of control devices based on input from one or more monitoring sensors so as to provide real time continuous operational control. The monitoring sensors may sense the working status of the auxiliary system (e.g. on/off/out of order/disrupt). The monitoring sensors may also sense the process carried out by the auxiliary system and thus provide process quality control (for example—environmental temperature, food preparation unit temperature, voice recognition for security needs, and the like) and (such as financial activities, inventory change, to name a few) for additional processing. The SCADA system is connectable to external utilities in order to provide them with data indicative of the unit 20's operation and condition for actuating external activities such as a security or maintenance call, taking inventory, cash collection and the like.

According to one embodiment, the unit 20 communicates with the above-mentioned external utilities via the communication medium through the remote computer 206. Alternatively, it can maintain direct communication with those utilities via the communication medium.

Thus, The activation, deactivation and monitoring of the systems (for example, the environmental units—the air-condition system 210 and the light system 212, or the food preparation systems 214) are controlled by the local computer 206. When a failure occurs, the remote computer 202 is notified, and an automatic request for maintenance operation is sent. This is only an example and other variants may apply. For example, the remote computer may transmit, through the communication medium, the desired food temperature (say, in accordance with standards prescribed by the chain headquarters) and the latter temperature will be monitored in the refrigerator using the refrigerator self thermostat circuitry, or possibly under the control of the local computer 206. Either the local computer 206 or the remote computer 202 controls the operation of the food preparation systems 214, and thus maintains the desired standards such as cooking time, cooking temperature and the like.

The local and remote computers 206; 202 also control the operation of the billing unit—cash register 216. This allows, for example, payment for the food services by sophisticated payment means such as credit cards, smart cards, member's card as well as cash money. The billing unit 216 can also be designed to receive additional payment means such as discount coupons and the like (for example, by utilizing a scanner). The financial activity of the unit 10 is monitored and the financial data that is gathered is transferred to the remote computer 202 to be analyzed for management needs. Alternatively, the financial data can be stored in the local computer 206 to be transmitted later to the remote computer 202. The local computer 206 can also handle some processing of the financial data. The specified cash register controls are only an example and others may be provided instead or in addition to the specified services, all as required and appropriate. Likewise the tasks distributions among the local and remote computers may vary, depending upon the particular application.

The local and remote computers 206; 202 also control a safety and security unit, for example, the entry door security system 218 to detect when the door is being opened. An authorization protocol such as voice recognition is then activated to require a verbal password, in order to ensure the entry of an authorized person only. If a false password is received or no password is given, then the control computer (202 or 206) immediately initiates an alarm signal for security or the police. The invention is not bound by the specified security system operations and accordingly other may be used in addition or in lieu of the above, depending upon the particular application.

By this embodiment, the levels of fuel, clean water and used water within the tanks are monitored by the supply monitoring system 220 which also monitors the food ingredients and possibly the inventory of other items. The latter items may be monitored using barcodes and scanners. The information that is gathered by either or both of the remote computer 202 and the local computer 206, can be used to initiate supply refill, financial monitoring, detection of abnormal financial movements and other management tasks. The data can be further processed to provide back-office reports such as periodical marketing reports and supplier's financial reports, as well as discrepancies between reports, for example, inventory vis a vis billing.

Note that whereas preferably the unit 10 is partially or wholly controlled by a remote control, by one embodiment it is also capable of operating in an autonomous mode of operation, say in case of communication failure with the remote unit, and by way of another example operating a stand-by battery power supply in the case of main power malfunction.

Note that the auxiliary systems illustrated in FIG. 5 are examples only and others may be used in addition or in lieu one or more of the specified systems, all as required and appropriate, depending upon the particular application.

In accordance with another embodiment of the invention, the food service unit is fully automated, thus providing automatic food service which involves automatic food preparation (e.g. cooking, grilling, boiling and the like, perhaps with the use of a conveyor).

As described above, the computer control enables continuous monitoring of the unit 20 during day and night, and while the unit is manned as well as it is unmanned, thus providing for high operational standards such as hygiene and security. For example, the freezer/refrigerator's temperature is monitored and controlled continuously to preserve the food ingredients in a suitable condition. Thus, the concept of the "smart" service unit is advantageous especially for services that requires continuous operation of the service unit systems under supervision.

Figure 6:
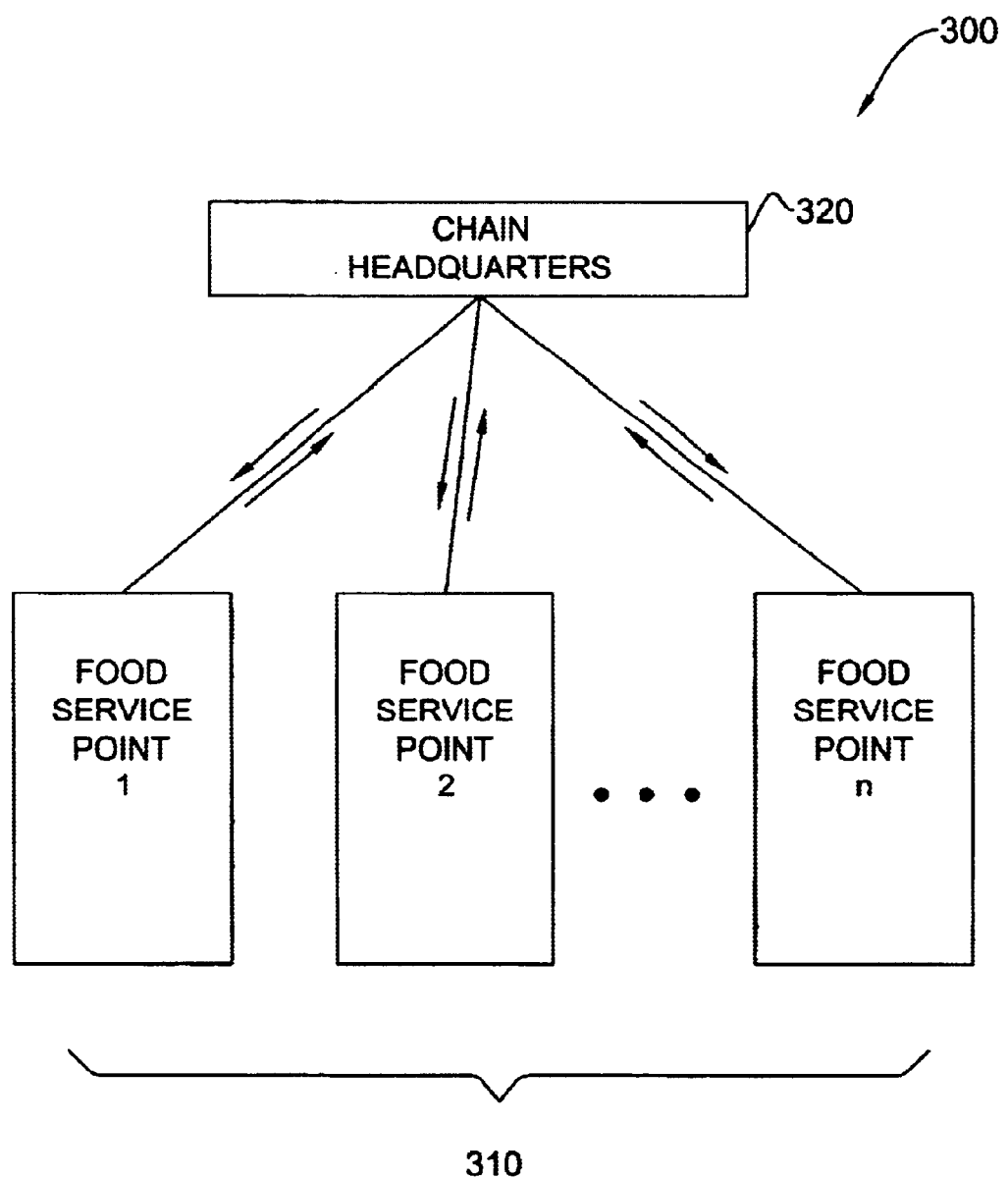
FIG. 6 illustrates the architecture of a food chain utilizing plurality of food service units, according to a preferred embodiment of the invention.

Turning now to FIG. 6, it illustrates, generally, the operation of a food chain 300, that consists of a plurality of smart food service units 310, each of which is operable and controllable by the chain headquarters 320. Each of the smart food service units 310 maintains bi-directional communication with the chain headquarters 320, i.e. the communication between the local control computer 206 and the remote control computer 202, as described above with reference to FIG. 5. Thus, the chain headquarters 320 is not only able to control the operation of each of the food service units, but can also integrate their function in order to achieve a higher level of efficiency and economy. For example, the headquarters 320 coordinates the food suppliers' route among units that operate in the same area, thus reducing the total cost of food supply for the chain. Additionally, the headquarters 320 manages the administrative proceedings to receive operation permit from the authorities in a specific area (e.g. police, fire brigade, etc.) and thus shortening the time-to-market for all units that are designed to operate in that area. Note that the invention is not limited to these examples of the operation of the headquarters.

The smart service units are uniform in their design, thus enabling mass manufacture which consequently reduces the overall cost for the chain deployment. Additional benefits stem from the efficient exploitation of commercial space and manpower: the smart unit is less space consuming with respect to the known chain restaurants and also need less manpower to operate it. Thus, a single smart service unit (as well as a chain of smart service units) can possibly yield the same output as a fast-food restaurant (and a fast-food chain)—i.e. services, revenues and the like—with reduced expenses.

The fact that data are received from each service unit and can be centrally analyzed at the headquarters facilitates the reduction of operational costs at each individual service unit, as well as the entire chain. The analysis of these data enables the headquarters to identify the pattern of—and the changes in—each service unit's commercial activities, and to provide immediate solutions such as a decision to relocate a specific service unit to a different location, making use of the mobility of each unit. Moreover, the fact that the units are substantially identical and operate in substantially the same manner enables rapid and large scale deployment of smart units and the sophisticated controlled operation of each unit, as described above, affords high operational standards of the chain, thereby constituting an important advantage. Moreover, since all units are uniformly constructed, bureaucratic processes in terms of licensing, safety, etc., are reduced. Personnel training are also uniform, thus hired personnel can be transferred from unit to unit, without having to undergo further training.

Another advantage of the unit being computer-controlled is that the operation of a single unit, as well as the management of the entire chain, requires a minimum number of dedicated personnel.

As also mentioned above, with reference to FIG. 1a, a digital sign can be attached to the unit, whose operation is also controlled by headquarters, enabling the planning and implementation of advertising policies which can be uniform to all units, or designed to suit the needs of a particular unit. Accordingly, the present invention provides an efficient and specialized advertising means which can be adapted to a specific location and service.

The invention is not limited to food preparation and serving, thus, according to another embodiment, the invention provides a non self-propelled mobile service unit transportable to a desired location of service, comprising:

computer controlled auxiliary systems for providing food service; said auxiliary systems including:
at least one environmental unit;
at least one dedicated service unit;
at least one billing unit;
at least one safety and security unit;
at least one data communication unit.

Accordingly, the invention also provides a service chain system that includes a plurality of non self-propelled mobile service stands located at geographically dispersed points of service; each service stand being a non self-propelled mobile service unit transportable to a desired point of service, and comprising: computer controlled auxiliary systems for providing food service; said auxiliary systems including:
at least one environmental unit;
at least one dedicated service unit;
at least one billing unit;
at least one safety and security unit;
at least one data communication unit.

For example, the dedicated service unit is designed to provide food services (such as retail services) as well as other services which require the combination of continuous computer-controlled processes with efficient mobility and self-functionality.

The present invention provides for a smart service unit and a chain of smart service units which can be placed and operated with no need or substantially with no need for local infrastructure (power, water and the like), and can operate in a self-functioning manner, as described above. Thus, the additional advantage of the present invention is the ability to provide sophisticated services at locations which do not have easy access to essential facilities needed for those services, for example—remote and deserted areas (say for military use) or locations having limited power or water availability.

The present invention has been described with a certain degree of particularity, but those versed in the art will readily appreciate that various alterations and modifications may be carried out, without departing from the scope of the following claims:

What is claimed is:

1. A non self-propelled and non towable mobile food service unit transportable to a desired location of service, comprising: computer controlled auxiliary systems for providing food service; said auxiliary systems including:
   at least one environmental unit;
   at least one food preparation unit;
   at least one billing unit;
   at least one safety and security unit; and
   at least one data communication unit.

2. The food service unit of claim 1, having weight and size that facilitate efficient transportation from one place to the other.

3. The food service unit of claim 2, wherein said weight falls in the range of 500 to 2000 Kg.

4. The food service unit of claim 2, wherein said size falls in the range of 2.5 to 3.2 meters.

5. The food service unit according to claim 1, wherein the computer control of at least one of said auxiliary systems is performed by a local computer located in said food service unit.

6. The food service unit according to claim 1, wherein the computer control of at least one of said auxiliary systems is at least partially controllable from a remote site through the data communication unit.

7. The food service unit according to claim 1, having a substantial spherical shape.

8. The food service unit according to claim 1, having an outer surface formed of one of the following: aluminum compounds, stainless steel, fiber glass-reinforced-concrete, and glass-reinforced-polymer.

9. A food chain system that includes a plurality of non self-propelled and non towable mobile food stands located at geographically dispersed points of service; wherein each food stand being a non self-propelled mobile food service unit transportable to a desired point of service, and comprising: computer controlled auxiliary systems for providing food service; said auxiliary systems including:
   at least one environmental unit;
   at least one food preparation unit;
   at least one billing unit;
   at least one safety and security unit; and
   at least one data communication unit.

10. The food service unit according to claim 9, wherein the computer control of at least one of said auxiliary systems is performed by a local computer located in said food service unit.

11. The food service unit according to claim 9, wherein the computer control of at least one of said auxiliary systems is at least partially controllable from a remote site through the data communication unit.

12. A method for operating a non self-propelled and non towable mobile food service unit comprising:
   transporting said unit to a desired location of service;
   selectively establishing connection between said unit and a remote site; and
   upon establishing connection, receiving instructions from the remote site regarding the condition and operation of said unit by using computer controlled means; said means including:
   environmental means;
   food preparation means;
   billing means;
   safety and security means.

13. A method for operating a food chain system that includes a plurality of non self-propelled and non towable mobile food stands; each food stand being a non self-propelled mobile food service unit transportable to a desired point of service, and comprising:
   determining the locating of the food stands at geographically dispersed points of service; and
   monitoring and controlling the condition and operation of each food stands from a remote headquarters using computer controlled auxiliary systems for providing food service; said auxiliary systems including:
   at least one environmental unit;
   at least one food preparation unit;
   at least one billing unit;
   at least one safety and security unit; and
   at least one data communication unit.

14. The method according to claim 13 further comprising:
   relocating at least one of the food stands in accordance with instructions from said remote headquarters.

15. A non self-propelled and non towable mobile service unit transportable to a desired location of service, comprising: computer controlled auxiliary systems for providing a service; said auxiliary systems including:
   at least one environmental unit;
   at least one dedicated service unit;
   at least one billing unit;
   at least one safety and security unit; and
   at least one data communication unit.

16. A service chain system that includes a plurality of non self-propelled and non towable mobile service stands located at geographically dispersed points of service; each service stand being a non self-propelled mobile service unit transportable to a desired point of service, and comprising: computer controlled auxiliary systems for providing food service; said auxiliary systems including:
   at least one environmental unit;
   at least one dedicated service unit;
   at least one billing unit;
   at least one safety and security unit; and at least one data communication unit.

17. The food service unit according to claim 16, wherein the computer control of at least one of said auxiliary systems is performed by a local computer located in said food service unit.

18. The food service unit according to claim 16, wherein the computer control of at least one of said auxiliary systems is at least partially controllable from a remote site through the data communication unit.

* * * * *